April 27, 1971     KENJI UEDA     3,576,731

RECTIFYING ELECTRODE FOR DIRECT CONNECTION TO A.C. SOURCE

Original Filed Aug. 16, 1967     2 Sheets-Sheet 1

INVENTOR.
KENJI UEDA
BY McGlew and Toren
ATTORNEYS

INVENTOR.
KENJI UEDA
BY McGlew and Toren.
ATTORNEYS

United States Patent Office 3,576,731
Patented Apr. 27, 1971

3,576,731
RECTIFYING ELECTRODE FOR DIRECT CONNECTION TO A.C. SOURCE
Kenji Ueda, Nagasaki, Japan, assignor to Mitsubishi Jukogyo Kabushiki Kaisha, Tokyo, Japan
Continuation of application Ser. No. 661,108, Aug. 16 1967. This application Apr. 27, 1970, Ser. No. 29,772
Claims priority, application Japan, Aug. 20, 1966, 41/54,668
Int. Cl. B01k 3/00
U.S. Cl. 204—228
5 Claims

ABSTRACT OF THE DISCLOSURE

A rectifying electrode, for direct connection to a source of A.C. potential while immersed in sea water or electrolyte, including a first layer of alkali-resistant electrically conductive metallic material, such as an alkali-proof metal, a second layer of electrically conductive metallic material insoluble in sea water and electrolyte, such an insoluble metal, and a layer of semi-conductor material interposed between the first and second layers in electrically conductive relation therewith. The rectifying electrode may be used as an electrode of an electrolytic cell or may be used as an electrode for protecting a structure against electrolysis.

This is a streamlined continuation of application 661,108 filed Aug. 16, 1967, now abandoned.

BACKGROUND OF THE INVENTION

Electrolytic apparatus, as well as corrosion protection apparatus using an electrode for protecting a structure against corrosion due to electrolysis, as by maintaining the potential of the structure above the corrosion-proof potential, requires a supply of D.C. potential. If the apparatus cannot be connected directly to a source of D.C. potential, then it must be supplied from a source of A.C. potential through a separate rectifier.

Conventional apparatus of this type, when used with a source of A.C. potential and a separate rectifier, has the disadvantage that, in the event a large current flow, such as an electrolytic current flow, is needed, rectifiers of very large capacity are necessary. The installation of such apparatus involves a very high expense, and maintenance of the rectifiers is difficult due to the generation of heat.

It is known to employ tantalum, aluminum, and the like as the material of an electrode in order to form an anodized coating or an oxide coating on the surface of the electrode by means of electrolysis and thus to operate with an A.C. potential source by taking advantage of the rectifying effect of the coating. However, conventional electrodes utilizing the rectifying effect of such coatings, as formed by electrolysis, require treatment in a particular electrolyte of a special concentration in order to form the coating, such as an oxide coating. Thus, to produce this type of electrode, it is necessary that the electrode metal be placed in a rectifying chamber containing such a particular electrolyte of special concentration and different from the electrolyte with which the electrode is intended to be ultimately used. Furthermore, such electrodes have a low efficiency because the resistance of the electrolyte used to form the oxide coating over the electrode surface is very high. Consequently, such a conventional type of rectifying electrode has the disadvantage that it is not only difficult to process but is also expensive.

SUMMARY OF THE INVENTION

This invention relates to rectifying electrodes and, more particularly, to a novel, high capacity, improved rectifying electrode for direct connection to a source of A.C. potential without the interposition of a rectifier.

In accordance with the invention, a rectifying electrode is provided which is free of the defects of conventional electrodes and is capable of use in electrolizing operations by direct connection to a source of A.C. potential and without the interposition of a rectifier. For this purpose, the rectifying electrode of the present invention includes a first layer of an alkali-resistant electrically conductive metallic material, a second layer of an electrically conductive metallic material which is insoluble in sea water and electrolyte and a layer of a semi-conductor material interposed between the first and second layers and in electrically conductive relation with the latter. A source of A.C. potential may be connected either to the alkali-resistant layer or to the insoluble layer.

The rectifying electrode of this invention can be used as an electrode for supplying a structure with electric curent for protection against corrosion due to electrolysis, as well as being usable as an electrode of an electrolytic cell. Furthermore, the electrode is equally useful in preventing marine life from adhering to underwater constructions by electrolizing sea water, containing chlorides, to produce chlorine. The electrode can also be used in the electrolytic treatment of waste water to purify the latter.

Accordingly, an object of the invention is to provide a rectifying electrode which does not require a separate electrolytic treatment before it can be used as a rectifying electrode.

Another object of the invention is to provide a rectifying electrode which can be connected directly to a source of A.C. potential without the interposition of a rectifier.

A further object of the invention is to provide a rectifying electrode which is simple in construction, easy to manufacture, and has a high current efficiency.

Yet, another object of the invention is to provide such an electrode including a layer of an alkali-resistant electrically conductive metallic material, a layer of electrically conductive metallic material which is insoluble in sea water and electrolyte and a layer of semi-conductor material interposed between the first two mentioned layers and in electrically conductive relation therewith.

A further object of the invention is to provide a rectifying electrode, for direct connection to a source of electric connection, and which is capable of being used in any type of electrolytic operation.

BRIEF DESCRIPTION OF THE DRAWINGS

For an understanding of the principles of the invention, reference is made to the following description of typical embodiments thereof as illustrated in the accompanying drawings.

In the drawings.

DESCRIPTION OF THE PREFERRED EMBODIMENTS

Figure 1:
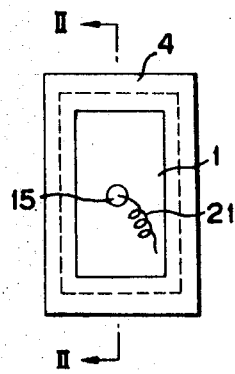
FIG. 1 is a front elevation view of one form of rectifying electrode embodying the invention.
Figure 2:
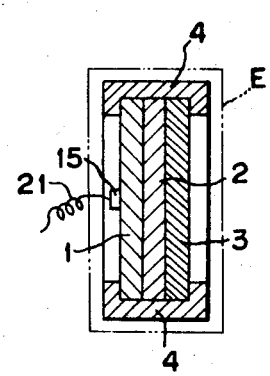
FIG. 2 is a sectional view taken on the line II—II of FIG. 1.

Referring first to FIGS. 1 and 2, an electrode E suitable for use as an electrode of an electrolytic cell, as a protecting electrode for protecting structures against corrosion due to electrolysis, as an electrode for the electrolysis of seawater to prevent marine growths from sticking to structures, or as an electrode for the purification of waste water, is illustrated at E. Electrode E comprises a plate-like electrical conductor 1 of alkali-resistant metallic material, a plate-like layer 2 of semi-conductor material and a plate-like layer 3 of an electrically conductive metallic material which is insoluble in sea water and electrolyte. These three plate-like layers are superposed one on the other, and an insulating material 4 is provided in the form of an open channel-shaped framework to provide a water-tight seal for the junctures between the three plates.

The alkali-resistant electrically conductive layer 1 may be a metal base body, and may comprise, for example, iron, copper, nickel and the like. While iron is desirable from the economic standpoint, the material of the base will be selected in accordance with the semi-conductor used. For example, if the semi-conductor is selenium, the base is made of iron and may be either plate-like or bar-like.

The semi-conductor material, fixed to the alkali-resistant conductor 1, may comprise, for example, selenium, silicone, germanium, cuprous oxide, or the like. The electrically conductive material or plate 3 is coated onto the semi-conductor material 2. The coating may be performed by fastening the insoluble material to semi-conductor 2 by screws, or by pressure or by thin plating. Suitable materials, insoluble in sea water and an electrolyte, include platinum, lead-silver alloys, magnetic iron oxide, and platinum-plated titanium.

For the insulating material 4, it is desirable to use materials of high heat conductivity and having good electrical insulation properties. By way of example, beryllium-base materials are particularly appropriate.

A terminal 15 is provided on the alkali-proof electrical conductor 1, and has a lead 21 secured thereto for connection to a terminal of a suitable source of A.C. potential.

Depending upon the particular application, either a single electrode E or a plurality of electrodes may be used. It may be desirable to interpose silver, indium or other suitable metal between the superposed surfaces of the three layers to reduce the contact resistance therebetween.

In using the electrode, an electrolytic cell may be provided with one or more of the electrodes E, and an A.C. potential is supplied directly from a transformer to the electrode E, the electrode E rectifying the A.C. potential to provide a D.C. current for the electrolysis, due to the provision of the semi-conductor layer 2 providing the rectifying characteristics. The electrode E does not require any rectifier when used with a source of A.C. potential, such as is required with conventional electrodes when so used. Furthermore, the rectifying electrode E can rectify current independently of the kind and concentration of the electrolyte in which the electrode E is used.

The maximum use temperature of the plates of the electrode is 75° C. for selenium and 65° C. for germanium. However, when used as an electrode in water, sea water, waste water and the like, the electrode temperature will not increase even with an increase in current per unit area, because the electrode is cooled by the water in which it is immersed. Consequently, the capacity of the electrode for electrolytic treatment of water is increased by the order of ten times. The type of electrode shown in FIGS. 1 and 2 has a very large capacity because it has a large radiating area.

Figure 3:
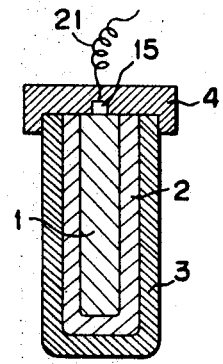
FIG. 3 is a sectional view of another form of rectifying electrode embodying the invention.

The electrode shown in FIG. 3 differs from that shown in FIGS. 1 and 2 in that the alkali-resistant conductor 1 has a rod shape and is enclosed within the semi-conductor layer 2 which, in turn, is enclosed within the layer of insoluble electrically conductive material 3, the upper ends of the three layers being exposed. While the top surface of conductor 1 is exposed to receive a terminal 15, and a conductor 21, connected to terminal 15, the upper surfaces of the three conductors, and particularly the joints therebetween, are coated or covered with the insulating material 4 to maintain water-tight joints at the upper end of the electrode. The operation and advantages of the electrode shown in FIG. 3 are essentially the same as those of the electrodes in FIGS. 1 and 2.

Figure 4:
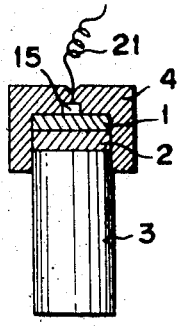
FIG. 4 is a part elevation and part sectional view of still another form of rectifying electrode embodying the invention.
Figure 5:
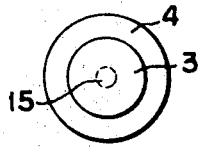
FIG. 5 is an end elevation view of the electrode shown in FIG. 4.

In the embodiment of the electrodes shown in FIGS. 4 and 5, the electrode 3, of metallic material which is insoluble in sea water and electrolyte, is in the form of a rod and the semi-conductor material 2 is in the general form of a disk placed on top of the rod, with the alkali resistant electrical conductor 1 being also in the form of a disk placed on top of the disk of semi-conductor material. A terminal 15 is applied to the alkali resistant conductor 1 and has a lead 21 connected thereto. The insulating material 4 covers the upper end of the assembly and extends down sufficiently over the side surface of the conductor 3 so that all of the junctures between the thre conductors are sealed in a water-tight manner. The arrangement of FIGS. 4 and 5 operates in the same manner of those of FIGS. 1, 2 and 3, and has essentially the same advantages.

Figure 6:
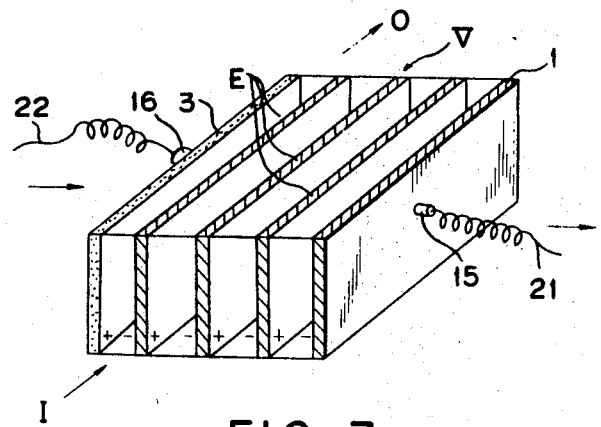
FIG. 6 is a somewhat schematic illustration of an electrolytic cell provided with rectifying electrodes embodying the invention.

In FIG. 6, an electrolytic cell V is indicated as having an end electrode 3 of electrically conductive metallic material, which is insoluble in sea water and electrolyte, provided with a terminal 16 to which is connected a lead 22, the end terminal 3 constituting the positive plate of the cell. The other end terminal of cell V is a negative plate of the alkali-resistant electrically conductive metal 1, and this is a negative terminal of the cell provided with a terminal 15 to which is connected a wire or conductor 21. Between the end plates 3 and 1, there are provided a plurality of rectifying electrodes E extending in spaced parallel relation to each other. An electrolyte can enter through an inlet I and exit through an outlet O.

An A.C. potential is connected across the conductors 21 and 22. When an electrolytic solution, such as seawater, for example, passes through electrolytic cell V from inlet I to outlet O, with an A.C. potential impressed between terminals 15 and 16, the A.C. current is rectified by the rectifying electrodes E and D.C. current flows from terminal 16 to terminal 15 (when the semi-conductor is selenium), so that electrolysis occurs. The arrangement shown in FIG. 6 is in the nature of a half-wave rectifier.

The electrolytic cell shown in FIG. 6 has many advantages. It is possible to effect electrolysis, with direct connection to a source of A.C. potential, without the interposition of a rectifier, and rectification is effected independently of the kind or concentration of the electrolyte, thus greately reducing the cost. The electrodes are water-cooled, and thus very efficient, from the cooling standpoint, as compared with the usual air-cooled electrodes, and the elements of the electrodes do not store heat. Since the temperature of the cell does not increase, the current flow can be increased by the order of ten times, or in other words, the current density may be greatly increased. Thereby the electrolytic equipment can be greatly decreased in size and electrolysis can be effected with very high power.

If seawater is electrolyzed, chlorine is generated to prevent adherence of marine growth on plants, machinery and equipment using sea water, such as ships, sea water conducting pipes, and the like. However, as the equipment operates in the nature of a half-wave rectifier, the transformer efficiency is only 50 percent.

The reason for using the plate 3, of metallic material which is insoluble in sea water and electrolyte, at one end of the cell and the alkali-resistant plate 1 at the other end of the cell, instead of using rectifying electrodes E at the ends of the cell, is that only one side of each end electrode is water-cooled, with the outer surface of each end electrode being only air-cooled.

Figure 7:
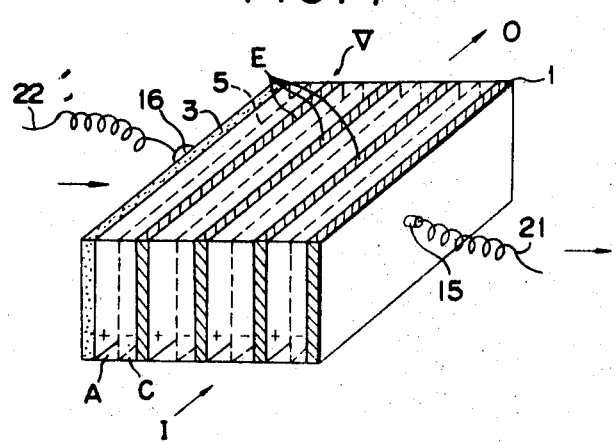
FIG. 7 is a view similar to FIG. 6 but illustrating another type of electrolytic cell provided with rectifying electrodes embodying the invention.

The embodiment of the invention shown in FIG. 7 differs from that shown in FIG. 6 in that membranes 5 of asbestos, glass fiber, and the like are interposed between the positive end plate 3, the rectifying electrodes E and the negative end plate 1, thus dividing each interelectrode space into an anode chamber A and a cathode chamber C. When an electrolyte, for example, waste water from a petroleum refining plant, containing water, or the like, is passed through the cell V from the inlet I to the outlet O, and an A.C. potential is applied between the terminals 15 and 16, the A.C. current is rectified by the rectifying electrodes E. When the semi-conductor material of each electrode 5 is selenium, D.C. current flows from terminal 16 to terminal 15 through electrolytic cell V so that electrolysis takes place.

With the arrangement of FIG. 7, the anode chambers A can be acidic and the cathode chambers C can be alkaline. Thus, and as distinguished from the embodiment of the invention shown in FIG. 6, the waste water, after electrolysis, becomes acidic in the anode chambers A and alkaline in the cathode chambers C. Thus, by varying the mixing ratios of solutions from the anode chambers A and the cathode chambers C, the pH adjustment of the waste water can be effected, for precipitation of hydroxide and a precipitation solution of hydroxide.

Figure 8:
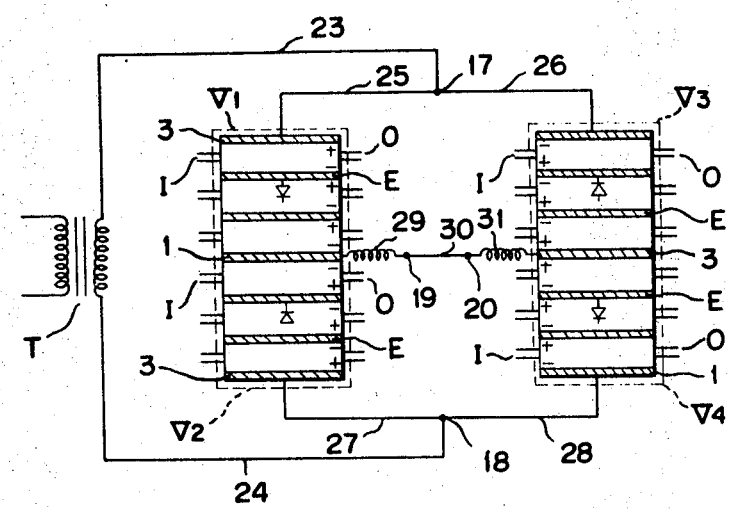
FIG. 8 is a schematic illustration of a full wave rectification electrolytic apparatus utilizing rectifying electrodes embodying the invention.

Referring to FIG. 8, while the arrangement illustrated therein may, at first glance, appear to comprise two electrolytic cells, it is actually a combination of four electrolytic cells $V_1$, $V_2$, $V_3$ and $V_4$. For the partition between cells $V_1$ and $V_2$, an alkali resistant electrically conductive plate 1, such as iron, is used. For the partition between cells $V_3$ and $V_4$, an electrically conductive material 3, which is insoluble in sea water and electrolyte, for example, lead-silver alloy, magnetic iron oxide, platinum, or platinum-plated titanium, is used.

A conductor 23 extends from one terminal of the secondary winding of a transformer T to a junction point 17, and a conductor 24 connects the other terminal of the secondary winding to a junction point 18. A conductor 25 connects junction point 17 to the end plate 3 of cell $V_1$, which is of electrically conductive material insoluble in sea water and electrolyte. A conductor 26 connects junction point 17 to the end plate 1 of cell $V_3$, and which is constructed of alkali-resistant electrically conductive material.

Junction point 18 is connected by a conductor 27 to the end plate 3 of cell $V_2$, which end plate is constructed of electrically conductive material which is insoluble in sea water and electrolyte, and a conductor 28 connects junction point 18 to the end plate 1 of cell $V_4$, which end plate is of alkali-resistant electrically conductive metallic material. The alkali-resistant material partition 1 between cells $V_1$ and $V_2$ and the conductive metal partition 3 between cells $V_3$ and $V_4$ are interconnected by a series circuit including lead wire 29, junction point 19, lead wire 30, junction point 20 and a lead wire 31. Between the anode and the cathode of each cell there are provided inlets I and outlets O for flow of an electrolytic solution through the cells, for example, sea water. Each cell further includes the rectifying electrodes E. The arrangement of FIG. 8 operates in the followng manner. Through the medium of transformer T, an A.C. potential is applied between terminals 17 and 18 and, during the positive half-wave of each A.C. potential cycle, direct current flows through conductor 23, junction point 17, conductor 25, cell $V_1$, conductor 29, junction point 19, conductor 30, junction point 20, conductor 31, cell $V_4$, conductor 28, junction point 18 and conductor 24. During the negative half-wave of the A.C. potential, direct current flows through conductor 24, junction point 18, conductor 27, cell $V_2$, conductor 29, junction point 19, conductor 30, junction point 20, conductor 31, cell $V_3$, conductor 26, junction point 17 and conductor 23. Thus D.C. current flows alternately through cells $V_1$–$V_4$ and $V_2$–$V_3$, the arrangement operating in the nature of a full-wave rectifier. The transformer efficiency is thus 100 percent as compared to 50 percent with the half-wave rectification.

If desirable, another electrolytic cell can be connected between junction point 19 and junction point 20. Furthermore, a three-phase source of A.C. potential may be used.

In the embodiments of the invention selected for illustration, the current flows in series through the cells, but parallel current flow or a combination of series and parallel current flow is possible. The number and the size of the electrolysis elements is selected in accordance with the quantity of fluid to be treated, the capacity of the electric source and the available voltage.

Figure 9A:
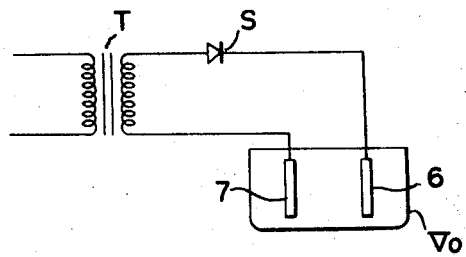
FIG. 9a is a schematic wiring diagram of conventional electrolytic apparatus.
Figure 9B:
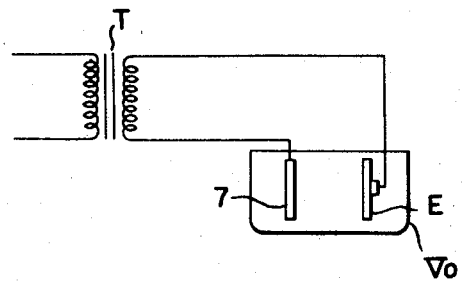
FIG. 9b is a schematic wiring diagram illustrating electrolytic apparatus utilizing rectifying electrodes embodying the invention.

FIG. 9a illustrates a conventional electrolytic cell arrangement in which power is supplied from a transformer T through a selenium rectifier S to an electrolytic cell $V_0$ having an anode 6 of lead-silver alloy and a cathode 7 of iron. In FIG. 9b, the power is supplied from transformer T to an electrolytic cell $V_0$ having a rectifying electrode E embodying the invention, as the anode, and an iron cathode 7. Electrode E comprises a layer of selenium secured to an iron base plate and having a coating of a lead-silver alloy. The electrolytic solution in both FIGS. 9a and 9b is a three percent sodium chloride aqueous solution.

The conventional selenium rectifier S of FIG. 9a has a 100 ma. rating and was supplied with a current of 1000 ma. In about one hour, each element of the selenium rectifier had swollen. On the contrary, in the arrangement of FIG. 9b using a rectifying electrode E embodying the invention, and as the electrode is water-cooled, there was no trouble after 1000 hours of current flow. However, the electrolytic solution has its temperature increased unless steps are taken, and consequently the solution was replaced to maintain its temperature at 20° C.

Prior to the present invention, apparatus for preventing marine growths adhering to a sea water inlet pipe having a capacity of 500 tons per hour involved a cost of 300,000 yen for a 300 a.–12 V. rectifier, and a cost of 400,000 yen for a platinum-plated titanium electrode. Utilizing the rectifying electrode of the present invention, there is no necessity for a rectifier. The transformer cost 50,000 yen and the electrode cost less than 100,000 yen.

While specific embodiments of the invention have been shown and described in detail to illustrate the application of the principles of the invention, it should be understood that the invention may be embodied otherwise without departing from such principles.

I claim:

1. In electrolysis apparatus of the type including a pair of electrodes immersed in an alkaline electrolyte and having a unidirectional potential impressed therebetween, the improvement comprising a rectifying electrode for direct connection to a source of A.C. potential, while immersed in and cooled by the alkaline electrolyte; said rectifying electrode comprising an electrically conductive alkali-resistant metal member selected from the group consisting of iron, copper and nickel, a second electrically conductive metal member of a metal insoluble in the alkaline electrolyte, and selected from the group consisting of platinum, lead-silver alloys, magnetic iron oxide and platinum-plated titanium, a layer of semi-conductor material, selected from the group consisting of selenium, silicon, germanium and cuprous oxide, interposed between and in contact with said first and second members and means, including said second member, sealing said first member and said semi-conductor layer from contact with the alkaline electrolyte, only said second member being in contact with the alkaline electrolyte.

2. In the electrolysis apparatus of claim 1 the rectifying electrode, for direct connection to a source of A.C. potential is in the form of a multi-layer plate electrode.

3. In the electrolysis apparatus of claim 1 the rectifying electrode, for direct connection to a source of A.C. potential is in the form of a rod electrode.

4. In the electrolysis apparatus of claim 1 the rectifying electrode, for direct connection to a source of A.C. potential, wherein said first member is in the form of a rod, and is laterally enclosed within said layer of semi-conductor material, said layer of semi-conductor material being laterally enclosed by said second member.

5. In the electrolysis apparatus of claim 1 the rectifying electrode, for direct connection to a source of A.C. potential, wherein said second member is in the form of a rod, said layer of semi-conductive material being in the form of a disk in engagement with one end of said rod and said first member in the form of a disk superposed on said disk of semi-conductor material.

References Cited

UNITED STATES PATENTS

| | | | |
|---|---|---|---|
| 2,201,940 | 5/1940 | Barrey | 117—200S |
| 2,933,661 | 4/1960 | Geib | 117—200S |
| 2,955,999 | 10/1960 | Tirrell | 204—290F |
| 3,133,872 | 5/1964 | Miller et al. | 204—290F |

WINSTON A. DOUGLAS, Primary Examiner

H. A. FEELEY, Assistant Examiner

U.S. Cl. X.R.

204—290